May 23, 1950
J. P. JONES, JR
2,508,759
CLOTHESLINE FASTENER AND TIGHTENER
Filed June 21, 1947
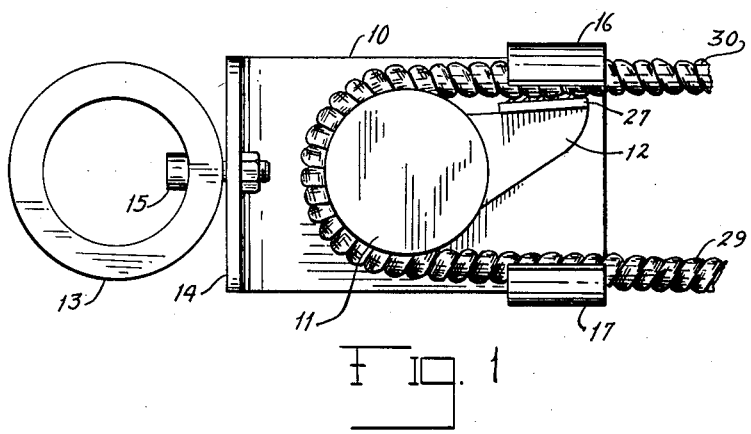
Fig. 1
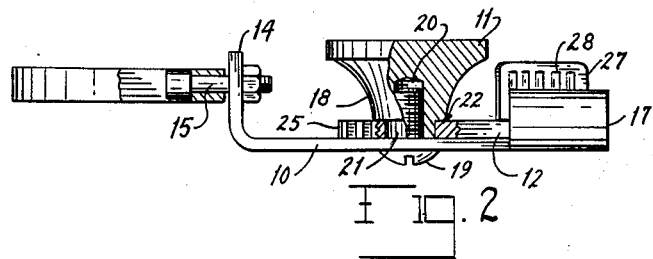
Fig. 2
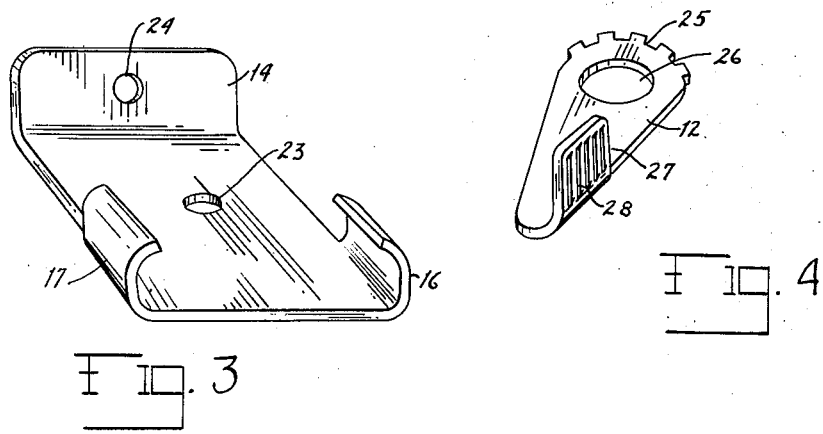
Fig. 3
Fig. 4
INVENTOR.
JOHN PAUL JONES JR.
BY Joshua R H Potts
HIS ATTORNEY Patented May 23, 1950

2,508,759

UNITED STATES PATENT OFFICE 2,508,759

CLOTHESLINE FASTENER AND TIGHTENER

John Paul Jones, Jr., Pottstown, Pa.

Application June 21, 1947, Serial No. 756,125

5 Claims. (Cl. 24—133)

This invention relates to a fastener for clothes lines which clamps the line with a gripping action, and in particular a fastener in which a clothes line is threaded through opposed clips around a knob and clamped in one of the clips by a latch element, the clamping action of which is intensified as tension is applied to the clothes line.

The purpose of this invention is to provide a clothes line fastener that may be located at the end of the line or at an intermediate point in which the end of a clothes line or part thereof may be inserted and held by gripping action thereby eliminating the necessity of tying knots in the line.

Clothes lines are normally held over hooks, posts, pulleys and the like by tying loops in the end of the line and when it is necessary to take slack out of the line, the knot must be untied and as the fastening means is usually relatively high, it is not only difficult to untie a knot in the line, but also difficult to hold the line in tension while another knot, or even the first knot is tied.

With this thought in mind, this invention contemplates a fastener having clamping elements through which a clothes line may be threaded, in which the end of the line or an intermediate part thereof may readily be gripped and in which slack may be taken out of the line at any time by drawing on the opposite end, actuating the latch and releasing the line.

A clothes line fastener in which the line is tied or fastened with a loop over a hook or the like is objectionable because the line tightens in damp weather and slackens as it dries out and with the line tied, it is substantially impossible to adjust the line with changes of the atmosphere. With the fastener of this invention, wherein it is only necessary to exert a slight force on the free end of the line to release the clamping action, the line may readily be slackened in damp weather and tightened in dry weather.

The object of this invention is, therefore, to provide a clothes line fastener in which an end or part of a clothes line may readily be clamped, which positively holds the line by a gripping action and which also makes it possible to readily adjust the length of the line.

Another object of this invention is to provide a clothes line fastener that may be used for holding clothes lines of rope, wire or substantially any material.

Another object of the invention is to provide a device for holding the ends of a clothes line in which the parts thereof are not affected by the elements.

Another object of the invention is to provide a device for holding clothes lines and the like that may be used at a plurality of points wherein the line may be strung around a yard or the like and in which the line will be positively gripped at each of said points.

Another object of the invention is to provide a fastener for clothes lines and the like which is self-supporting wherein both hands of the operator are free to place the line in the fastener.

A further object of the invention is to provide a fastener for holding clothes lines and the like without tying the line, which is of a simple and economical construction.

Various other detailed objects and advantages, such as arise in connection with the manufacture and design of the clothes line fastener in accordance with the above-mentioned objectives will in part become apparent and in part be hereinafter stated as the description of the invention proceeds.

More in detail, the invention embodies a base having a pivotally attached eye at one end with opposed upwardly extending arcuate clips at the edges of the other end, a centrally disposed knob on the upper surface of the base, intermediate of the ends and a latch pivotally mounted at the base of the knob and provided at the outer end with an upwardly extending projection positioned to coact with one of the said clips to clamp the clothes line in the clip.

For a full and more complete understanding of the invention, reference may be had to the following description and accompanying drawings wherein:

Figure 1 is a plan view of the fastener.

Figure 2 is a view showing a side elevation of the fastener with parts broken away wherein parts of the elements are illustrated in section.

Figure 3 is a view showing the base of the fastener.

Figure 4 is a view showing the latch that is pivotally mounted on the base.

Referring now to the drawings wherein like reference characters indicate corresponding parts, the fastener of this invention comprises a base 10, a knob 11, a latch 12 and an eye 13 which is pivotally attached to a flange 14 at one end of the base by a bolt 15.

The base 10 is preferably formed of a flat sheet of material with the end 14 bent upward, as shown, and with upwardly extending arcuate clips 16 and 17 positioned on opposite corners of the opposite end.

The knob 11 is positioned centrally of the base and intermediate of the ends and the lower end 18 thereof is secured to the base by a screw 19 that is threaded upward in a centrally disposed opening 20. At the lower end of the knob 11 is a short section 21 of a diameter smaller than that of the part 18, providing a shoulder 22 and the latch 12 is freely rotatable on the section 21 between the shoulder 22 and the upper surface of the base. The intermediate surface 18 of the knob is undercut and of arcuate shape providing a sliding and holding surface for a clothes line or the like. The screw 19 extends through an opening 23 in the base and the flange 14, at the end of the base is provided with an opening 24 through which the bolt 15 extends.

The latch 12, as shown in Figure 4, is formed of a flat plate with teeth 25 in an arcuate end concentric with an opening 26 therein which receives the section 21 of the knob and on one side of the opposite end of the latch is an upwardly extending projection 27 with corrugations or serrations 28 therein providing a gripping surface.

The clothes line fastener of this invention includes a base with arcuate clips at the outer end and a latch pivotally mounted on a knob and with a clothes line placed in the fastener as illustrated in Figure 1; one end 29 of the line may be pulled wherein the line passing over the teeth 25 of the latch will actuate the projection 27 of the latch to gripping action with the end 30 of the line. By this means, the line is positively gripped or clamped in the fastener, as illustrated and described.

With the line held in this manner, a slight pull on the line 30 will actuate the latch in the releasing action so that the line will be released and may be removed from the fastener or may be passed through the fastener to pick up slack therein or to release tension in the line as may be desired.

While preferred specific embodiments of the invention are hereinbefore set forth, it is to be clearly understood that the invention is not to be limited to the exact constructions illustrated and described, because various modifications of these details may be provided in putting the invention into practice within the purview of the appended claims.

What is claimed is:

1. In a clothes line fastener, a base having an eye at one end and opposed spaced arcuate clips at the other, a centrally disposed knob positioned on the base midway of the length thereof, and a latch pivotally mounted on the knob and having a hub adapted to be engaged by a clothesline passing around said knob to cause rotation of said latch and a gripping projection positioned to coact with one of said clips to clamp said clothes line therein.

2. In a clothes line fastener, a base having an eye at one end and opposed separated arcuate clips at the corners of the other end, a centrally disposed knob positioned on the base midway of the length thereof having a head with an arcuate undersurface, and a latch pivotally mounted at the base of the knob and having a hub formed with teeth that are adapted to be engaged by a clothesline passing around said knob to cause rotation of said latch and a gripping projection positioned to coact with one of said clips to clamp said clothes line therein.

3. In a clothes line fastener, a base having an eye at one end and opposed separated arcuate clips at the other, a centrally disposed knob positioned on the base midway the length thereof, said knob having an enlarged head with an arcuate undersurface, and a latch pivotally mounted on the base, means on said latch adapted to be engaged by a clothes line to cause rotation of said latch, and means on one end of said latch positioned to coact with one of said clips to clamp said clothes line therein.

4. In a clothes line fastener, the combination which comprises a base having an eye pivotally mounted at one end and opposed separated arcuate clips at the other, a centrally disposed knob with an undercut surface positioned on the base midway of the length thereof and a latch pivotally mounted on the base having a hub formed with teeth and a gripping element on one end positioned to coact with one of said clips to clamp a clothes line therein as an incident of engagement of said teeth by said clothes line.

5. In a clothes line fastener, the combination which comprises a base having an eye pivotally mounted at one end and opposed separated arcuate clips at opposite corners of the other end, a centrally disposed knob having an enlarged head with an undercut surface between the head and base positioned on the base midway of the length thereof, and a latch having a hub with teeth on the surface thereof pivotally mounted on the knob and having an upwardly extending clamping projection on the outer end positioned to coact with one of the clips of the base to clamp a clothes line or the like extending through the clips and around the knob in the clip.

JOHN PAUL JONES, Jr.

REFERENCES CITED

The following references are of record in the file of this patent:

UNITED STATES PATENTS

| Number | Name | Date |
|---|---|---|
| 339,551 | Hughes | Apr. 6, 1886 |
| 895,590 | Sprague | Aug. 11, 1908 |
| 1,167,295 | Hall | Jan. 4, 1916 |
| 1,243,107 | Richardson | Oct. 16, 1917 |
| 1,370,963 | Hoggblom | Mar. 8, 1921 |
| 1,389,514 | Kestell | Aug. 30, 1921 |
| 1,693,960 | Rames | Dec. 4, 1928 |